July 14, 1931.  W. L. SCHELLENBACH  1,815,012
TOOL ATTACHMENT FOR LATHES
Filed June 19, 1929  8 Sheets-Sheet 1

Fig. 1.

INVENTOR
BY William L. Schellenbach
Wood & Wood ATTORNEY.

July 14, 1931.  W. L. SCHELLENBACH  1,815,012
TOOL ATTACHMENT FOR LATHES
Filed June 19, 1929   8 Sheets-Sheet 3

INVENTOR
William L. Schellenbach
BY
Wood & Wood ATTORNEYS

Fig. 7.

Patented July 14, 1931

1,815,012

UNITED STATES PATENT OFFICE

WILLIAM L. SCHELLENBACH, OF WYOMING, OHIO, ASSIGNOR TO THE AMERICAN TOOL WORKS COMPANY, OF CINCINNATI, OHIO, A CORPORATION OF OHIO

TOOL ATTACHMENT FOR LATHES

Application filed June 19, 1929. Serial No. 371,993.

This invention relates to lathes and is particularly directed to a method of and tool attachment for forming irregular grooves. The tool attachment herein disclosed is applied particularly for the formation of grooves in the surface of a cylindrical surface such as the periphery of a forging roll. In this type of work the grooves to be cut vary considerably as to longitudinal relief or depth and transverse relief. Each groove, formed in the roll, is a special cutting operating including shoulders and depressions throughout its length creating a problem in which movement of the tool must be definitely controlled and the repeating cuts uniform as the tool is moved into the work.

For this purpose, a relieving attachment is mounted on the cross slide of the lathe, in which a tool is mounted, on a pivoted tool holder rocked toward the work by means of templet cams. The tool is made sectional for permitting transverse spread of the same and another templet cam acts to spread the sections of the tool either concurrently with or independently of the action of those cams which impart rocking motion to the tool holders. By concurrent action of the cams, which cams may be termed longitudinal relief cam and transverse relief cam, respectively, the actions thereof may be variably overlapped so that any transverse or longitudinal relief may be obtained. The cams are driven in synchronism with the spindle of the lathe and as templets, may be provided of any desired configuration.

It is an object of this invention to provide an improved method of forming grooves of varying longitudinal or transverse relief.

Another object is to apply this method from the cross slide of a lathe for cutting irregular circumferential grooves in cylindrical work.

Another object is to provide a relieving attachment for a lathe for accurately cutting irregular grooves in cylindrical surfaces, and to provide that the tools are accurately controlled by tool feeding templet cams and the tools and cams interchangeable for forming a groove of any shape.

Another object is to provide a relieving attachment for a lathe in which the tool and feeding medium therefor for varying the groove depth or longitudinal relief of the groove and the tool and feeding medium for varying the transverse formation of the groove may be used independently or concurrently.

Further objects and advantages will be more fully set forth in a description of the accompanying drawings, in which.

The relieving attachment is shown for cutting a plurality of irregular grooves in a forging roll. The drawings disclose the forging roll properly secured on a mandril fixed between the face plate of the headstock and the tailstock of the lathe for rotation. The particular piece of work illustrated is a semicircular shell and the grooves formed in the face thereof are extremely irregular as to width and depth, the relief varying in each instance.

Described in general, the relieving attachment 30 of the present invention is incorporated in the tool slide 31 which in turn is mounted in the conventional manner on the lathe carriage 32 on the lathe body 33. The drive for the relieving attachment is taken from the headstock 35 of the lathe by means of a longitudinally extending shaft 34 having a splined end passing through a gear casing 36 at the headstock end of the lathe and driven from the headstock by a train of gearing. The other end of the shaft is journalled on the carriage 32 and extends into the tool slide 31. Through gearing in the tool slide, a set of cams is driven by the shaft 34 for feeding the tool or tools.

The tools 39 are secured on the swinging sections 37 of the tool holder which holder is rocked toward and from the work for depth by means of templet cams 38. The tools 39 may be regarded as sections since they may function together or may be moved apart for transverse relief. A cam 41 actuates an element 40 which laterally spreads the tool holders 37 and the tool sections at the appropriate time to transversely relieve the groove being cut. The cams may act to rock and spread the tool simultaneously, that is, the cam imparted motions may be overlapping to produce any depth or width groove desired and any variation along the groove length. The shape of the cams is varied depending on the particular groove desired to be cut. The cross slide is preferably manually fed inasmuch as these operations are extremely special and require the constant attention of the operator. The cross slide 31 is mounted on the conventional cross slideways of the carriage and is moved by means of a stationary nut 42 on the slide traversed by a screw 43 journalled across the carriage, the screw rotated by means of a hand wheel 44.

Figure 2:
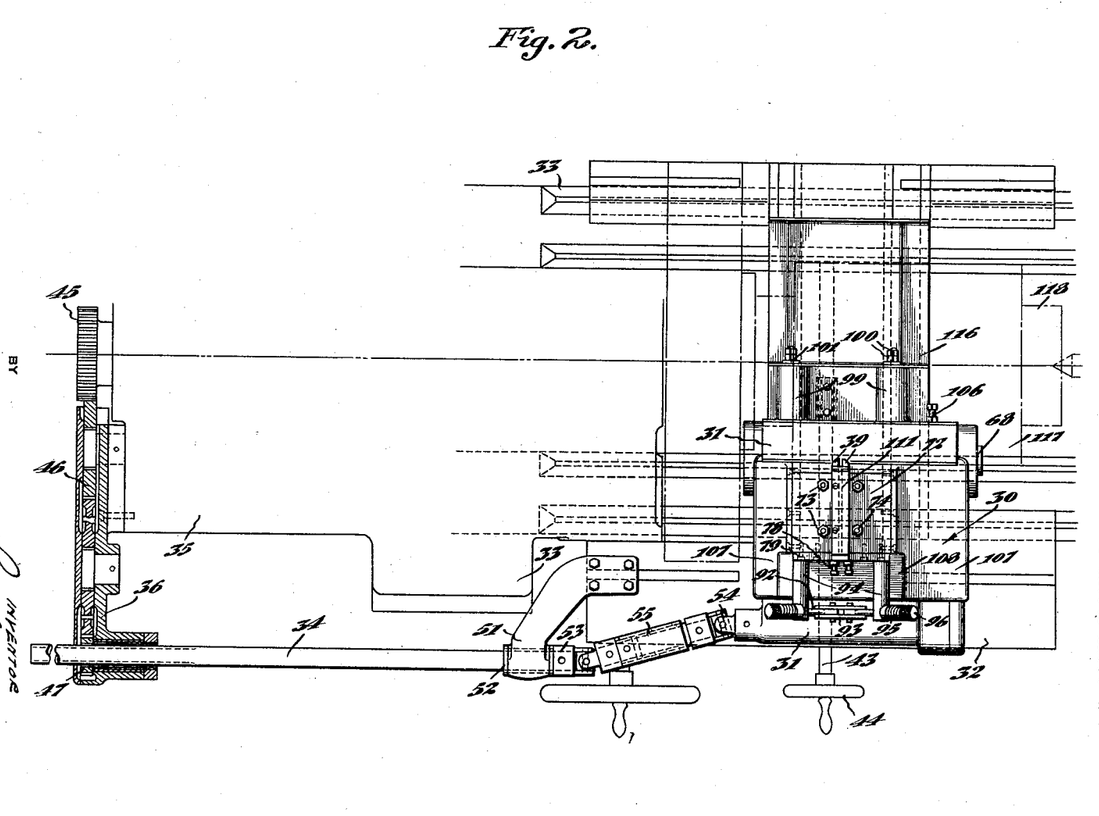
Figure 2 is a fragmentary top plan view illustrating the drive transmission to the attachment.

As illustrated in Figure 2, the drive is taken from a driving gear 45 secured on the spindle of the lathe, through a train of gearing 46, for driving a gear 47 journalled in the gear casing 36 secured to the headstock. The shaft 34 has its splined end supported in and traversing the gear 47 and casing 36. The other end of the shaft 34 is journalled in a bracket 51 secured to the carriage, this bracket carrying a headed bearing sleeve 52 loosely traversed by the shaft and a collar 53 pinned to the end of the headed sleeve and through the shaft. This arrangement prevents longitudinal movement of the shaft relative to the bearing arm and movement of the carriage on the lathe bed slides the splined end of the shaft through the gear 47 and casing 36.

A stub shaft 54 is mounted in the casing of the tool slide in parallelism with the drive shaft and connected thereto by means of a universal joint 55. The end of the stub shaft extending into the casing of the tool slide carries a gear 56 meshing with a transmission gear 57, and the gear 57 meshes with a gear 58 pinned to the end of the cam shaft 59, this cam shaft also being disposed parallel to the drive shaft as well as the spindle of the lathe.

The cam shaft is journalled, at that end carrying the gear, in an integral bearing 60 formed in the cross slide. The other end of the cam shaft is journalled in a bearing 61 bolted in position on the cross slide. The bearing element 61 is removable through an opening 62 at the side of the cross slide for permitting the sliding of the cams from the shaft when it is desired to interchange the same.

The shaft provides a shoulder 63 toward the gear end and a key-slotted intermediate portion having its end toward the removable bearing threaded for receiving a nut 64, the nut adapted to clamp the set of cams against the shoulder. A key 65 is inserted in the key slot to maintain the gears unitarily for rotation with the shaft.

For a combined transverse and depth relief, a set of three cams is used arranged as follows:

The outside cams or depth relief cams 38 are disposed at each side of and spaced away from an intermediate transverse relief cam 41 by means of spacer collars 66. An oil trough or receptacle 67 is secured in the slide below the set of cams in such relation that the cams are always partly immersed in oil. It will be apparent that in order to interchange the cams the shaft bearing is removed, the nut unscrewed, and the cams, including the loosened oil trough, are pulled from the shaft through the bearing opening.

A rock shaft 68 is journalled in the side walls of the cross slide between the spindle and the cam shaft and parallel thereto. This rock shaft pivotally journals the swinging tool holder sections 37 and the swinging actuator 40 for spreading the sections of the tool, the swinging elements in each instance being in engagement with a respective cam by means of a roller.

In the instance of the tool holders which swing unitarily, the rollers 69 thereof are disposed towards the inside thereof and are urged against the upper portions of the cams. The tool sections 39 are mounted along the upper inner face of the tool holders, being transversely disposed relative to the work on the mandril.

Tool seats 71 are secured in grooves formed longitudinally along the upper inner edges of the tool holders, these seats each providing the lower edge and back of a dovetail groove for receiving a tool section. The tool sections 70 are of dovetail formation fitting in the seats and are clamped therein by means of clamping blocks 72 drawn down against the tool holders by means of nuts 73 on studs 74 extending upwardly from the holders through the blocks. The undersides of the blocks are provided with inner lugs 75 having inclined under surfaces engaging the inclined upper edges of the tools and outer lugs 76 seating in grooves 77 in the upper outer edges of the tool holders. The tool sections are adjusted in the seats by means of screws 78 mounted in plates 79 secured to the outer face of the tool holders, these screws engaging the rear ends of the tools. The screws are locked in position by means of nuts 80.

Figures 8, 9:
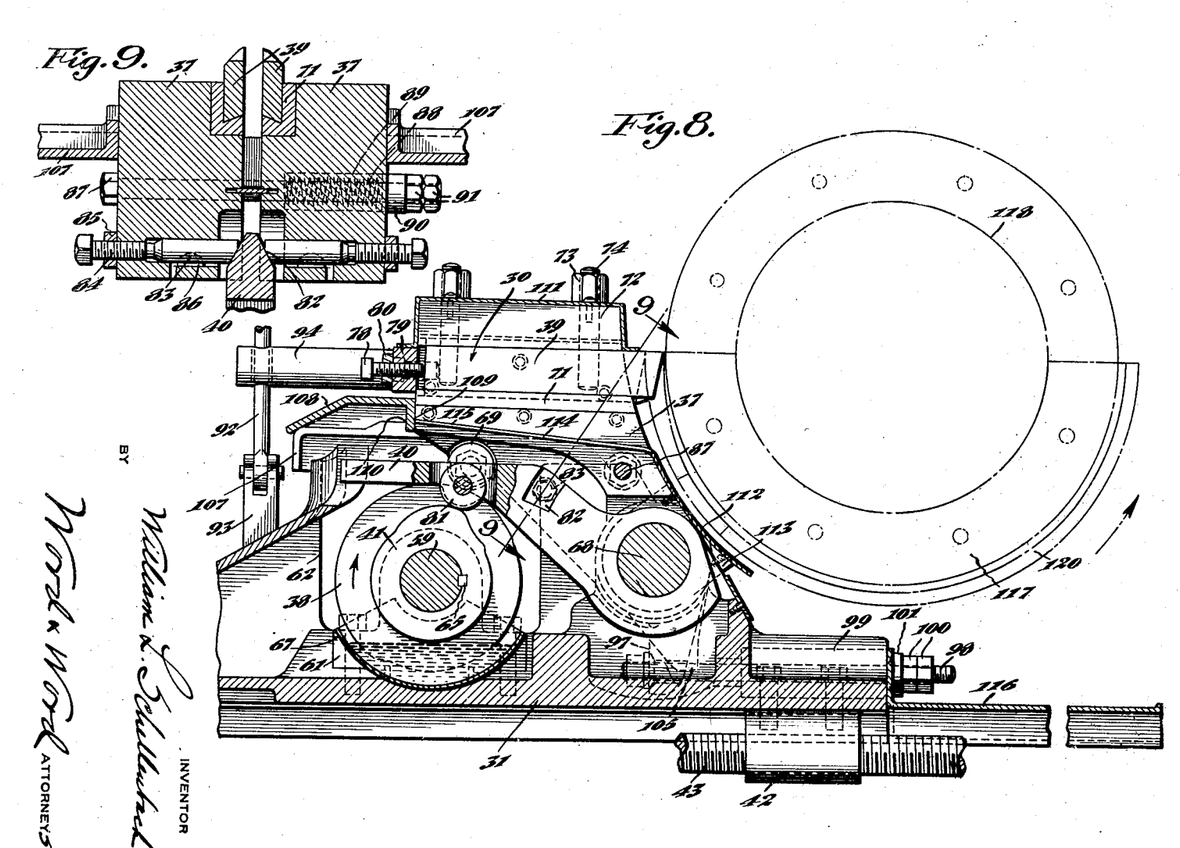
Figure 8 is a sectional view taken on line 8—8, Figure 4, illustrating the tool holders and spreading element in innermost position for fully relieving a groove.
Figure 9 is a sectional view taken on line 9—9, Figure 8, detailing the tool sections and the means for spreading the same.

The tool holders are longitudinally shiftable on the rock shaft by means of the actuator or spreader element mounted therebetween. This actuator has a roller 81 engaging the intermediate cam and, as detailed in Figure 9, has a double wedge portion 82 swinging between pins 83, one in each tool holder, adjustably set relative to each other by means of set screws 84 axially aligned therewith and extending into the outer sides of the tool holders and engaging the outer ends of the pins. Nuts 85 are provided for securing the set screws in position, and the pins are prevented from rotating by means of keys 86.

It is vital to efficient accurate cutting that the tool be held firmly. Since the tool holder is sectional, the sections each comprising a tool section moving away from each other transversely, the tool sections must move in precisely the same manner. To steady the tool sections and to prevent any overthrow or chattering of the tools and holders, three means are provided.

First, the tool holders are constantly urged together by means of a draw bolt 87 passing transversely through the tool holders parallel to the pins and having a compression spring 88 seating against the base of a recess 89 in one tool holder and held thereagainst by means of a collar 90 and nuts 91 on the draw bolt. This compression is applied to the section directly transverse to the tools and just above the rock shaft.

Secondly, the extreme outer or swinging ends of the holders are urged inwardly and downwardly by means of rods 92 pivoted on a common bracket 93 secured to the cross slide casing and traversing respective studs 94 extending out from respective plates 79 and compression coil springs 95 drawn down against the studs by means of adjustment collars 96. The springs act to firmly engage the rollers of the holders against the cams as well as urging the sections of the holders together. As the holder sections move outwardly, the rods rock on their pivots and the springs compress.

In the third means, lugs 97 are formed integrally with the holders and extend down below the rock shaft. Draw bolts 98 traverse these lugs 97 and bosses 99 in the cross slide. Nuts 100 and washer 101 are provided on the end of each bolt, the washers engaging the lugs on the holders and collars 102 on the other ends of the bolts. Each collar 102 compresses a coil spring 98ª against the inner end of a large bore 103 through which the bolt extends. Inasmuch as the holders move transversely relative to the cross slide, the washers are provided with convex faces seating in concave seats in the lugs 97 and the collars 102 respectively, this permitting rocking of the connections. The bores in the lugs and collars are large to permit the disalignment of the bolts, and the apertures 103 in the cross slide through which the bolts pass are sufficiently elongated to permit the lateral movement of the bolts and shifting of the holders.

The tool holders rock as a unit due to the draw bolt 87 passing through them and one is pinned to the rock shaft by means of a pin 104 traversing one of said holders, the other holder sliding relative to the pinned holder. The other holder has a lug 105 extending downwardly therefrom adapted to engage an adjustable stop screw 106 secured in the cross slide frame. The stop screw 106 is adapted to be engaged by the unitarily moving tool holders when the cams are removed for interchange when the tendency of the springs would be to displace the tool holders. Normally, however, the stop screw is entirely functionless and does not interfere with the rocking movements of the tool holders.

Covers or guards 107 are secured to and extend outwardly from the outer sides of the respective tool holders. Another cover 108 is secured upon the two previously mentioned covers, this cover spanning the space between said side covers toward the rear of the tool holders. This third cover has a flange 109 in slidable engagement with the front face of the tool holders and fits within grooves 110 formed in the upper faces of the side covers. The space between the tool holders is covered by means of a plate 111 spanning the space therebetween and secured to one of the tool holders, this plate being suitably shaped to extend along the upper edges of the clamping blocks and down the front and rear edges thereof.

Another plate guard 112 is secured on the rock shaft by means of washers 113, the rear faces of these washers being curved to receive a curved plate covering the rear of the tool holders, this plate having a tongue 114 (see Figures 8 and 9) extending forwardly between the respective tool holders and within adjacent slots 115 therein. Another cover 116 is secured to the inner side of the tool slide extending out over the slideways for the tool slide to prevent the cuttings from dropping into the slideways.

Figure 1:
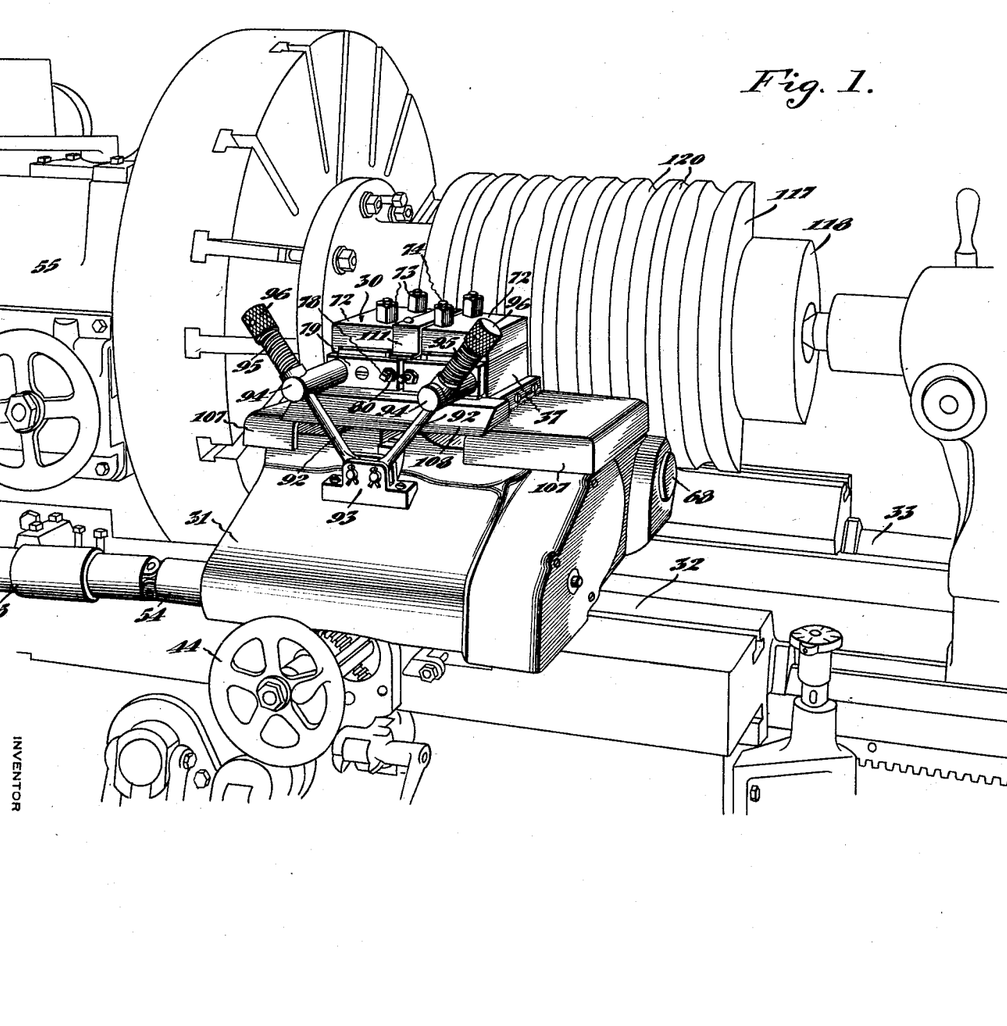
Figure 1 is a perspective view of the central portion of the lathe, illustrating the relieving device of the present invention and showing the work in position for operation thereon by the device.
Figure 3:
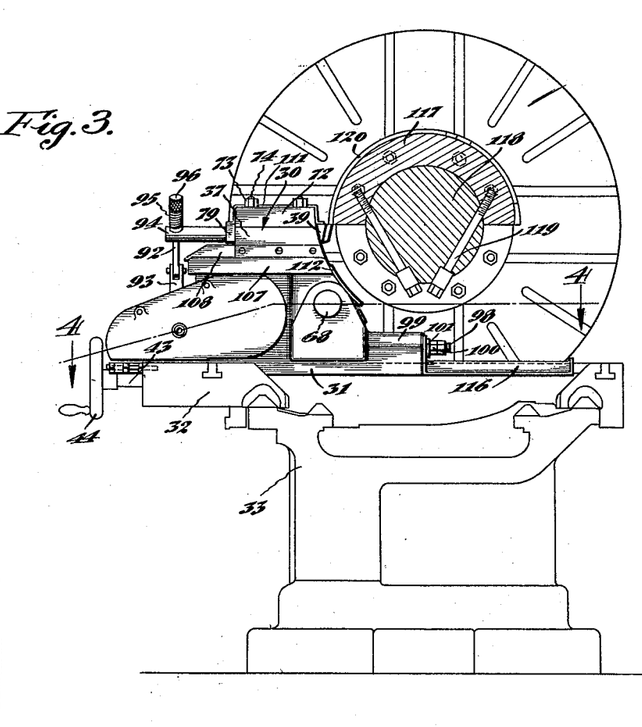
Figure 3 is a view taken transversely of the lathe illustrating the position of the relieving attachment relative to the work and showing the means for attaching the work to the mandril.
Figures 4, 5, 6:
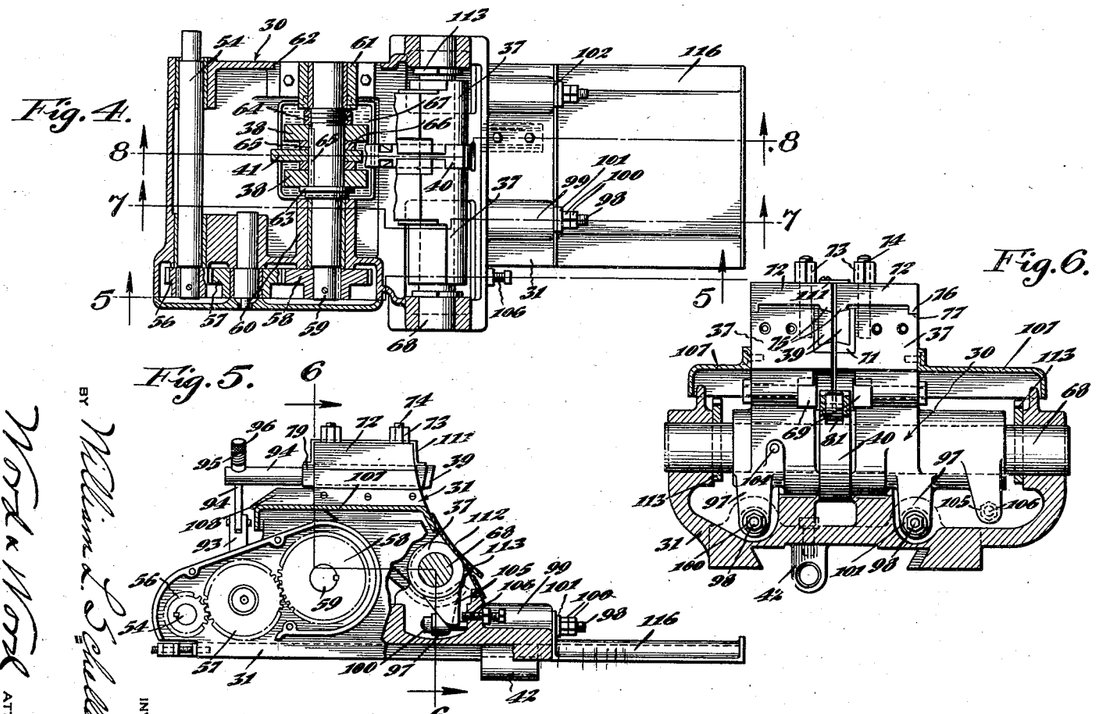
Figure 4 is a sectional view taken on line 4—4, Figure 3, further detailing the power transmission to the tool operating cams.
Figure 5 is a sectional view taken on line 5—5, Figure 4.
Figure 6 is a sectional view taken on line 6—6, Figure 5.
Figure 7:
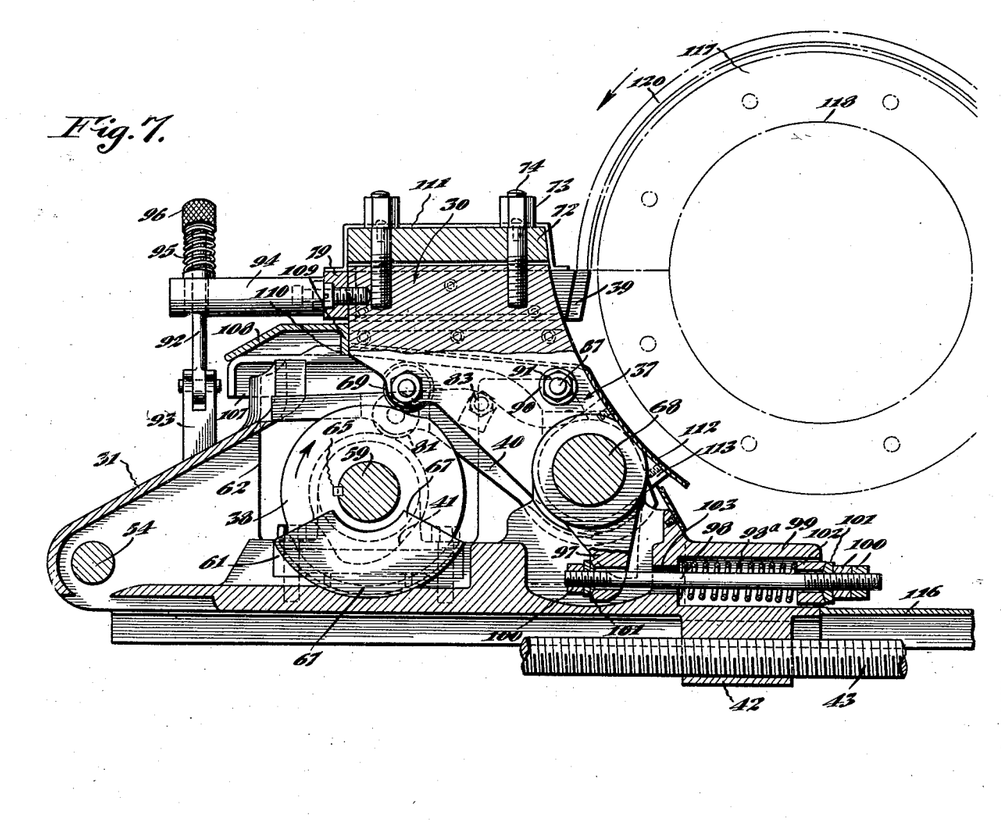
Figure 7 is an enlarged sectional view taken on line 7—7, Figure 4, illustrating the tool holders in fully retracted position relative to the cams.

The shell or forging roll 117 to be grooved, as shown in Figures 1 and 3, is secured to the mandril 118 by means of bolts 119 passed through the mandril and screwed into the shell. The mandril used is of considerable diameter, fitting the interior of the shell, and affords a solid rotating support for the shell.

Figures 10, 11:
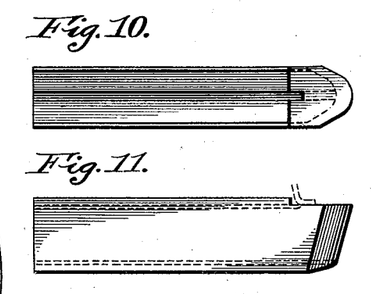
Figure 10 is a top plan view of a single tool.
Figure 11 is a side elevation of the tool.
Figures 12, 13:
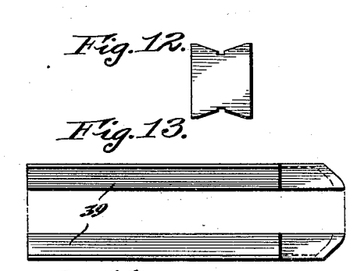
Figure 12 is a rear end view thereof.
Figure 13 is a top plan view of a pair of tool sections.
Figure 14:
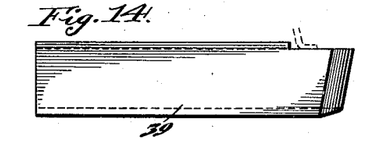
Figure 14 is a side elevation of one of the tool sections.
Figure 15:
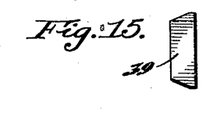
Figure 15 is a rear end view of a tool section.
Figure 16:
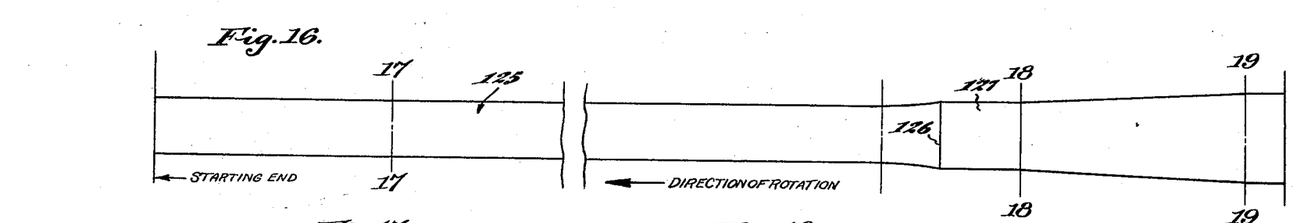
Figure 16 is a diagrammatic view illustrating the development of a particular groove.

As shown in Figures 10 to 15, there are two general types of tools used in combination with the relieving attachment. Figures 10 to 12 inclusive, illustrate a single tool which, when secured in the tool seats in the respective tool holders, binds the tool holder sections together, and inasmuch as there is no transverse relief cam used the tool holders are swung, as a non-spreadable unit, to perform a cut having only depth irregularities. Figures 13 to 15, inclusive, illustrate the sectional type of tool which has been described heretofore and which may be active either for depth irregularities or transverse relief.

The roll of work is illustrated in Figure 1 as having a plurality of grooves 120, all of which are irregular and of different formation. In Figures 16 to 21 inclusive, the developed view of a particular groove 125 is illustrated, and sectional views are taken on the developed view to illustrate the particular depth and transverse relief at various points along the groove. These figures also include a diagrammatic view of the depth cam 123 and the transverse relief cam 124 for forming the particular groove 125 illustrated.

Figures 17, 18, 19, 20, 21:
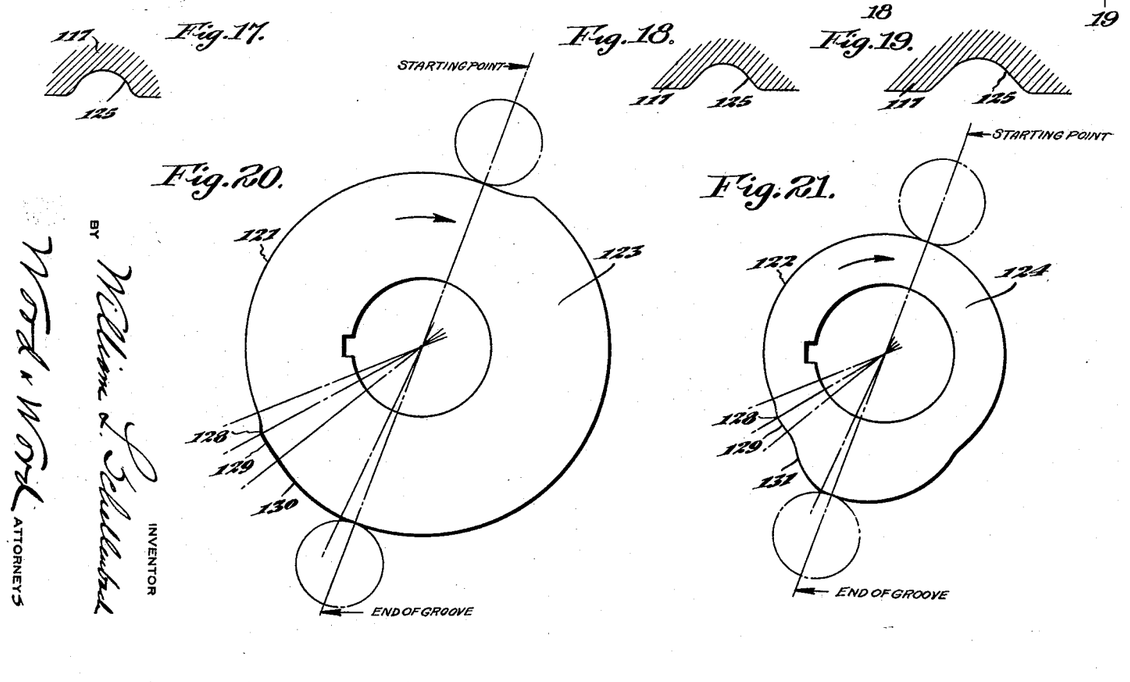
Figures 17 to 19, inclusive, are sectional views taken as illustrated in Figure 16 showing the cross sectional configuration of the groove at various points along its length.
Figure 20 is a view of the cam for controlling the depth movements of the tool holders for forming the particular groove illustrated in Figure 16.
Figure 21 is a side view of the cam for transversely moving the tool sections to provide the transverse relief contour of the groove illustrated in Figure 16.
Figure 22:
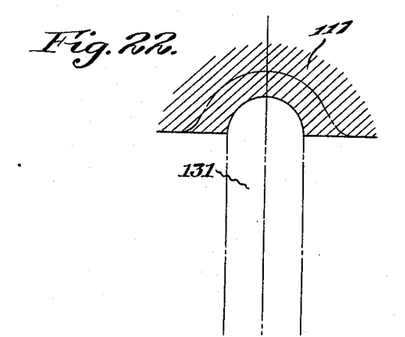
Figures 22 to 25, inclusive, illustrate the steps in the tooling operations for forming a particular groove.

The straight portion of the groove, on which Figure 17 is taken, is cut while the tool holder is in position of dwell both as to depth and transverse relief, as will be noted from the concentric surfaces 121, 122, of the cams 123, 124, respectively.

As illustrated in Figure 18, the cams have been active to increase the depth of the groove as well as the width of the groove producing a relief shoulder 126 and a straight portion 127 due to the corresponding points 128 and corresponding concentric surfaces 129, respectively, of the two cams which act concurrently on the two holders.

Figure 19 shows the groove as of still greater depth and of still greater transverse relief, these changes in the groove relief being obtained by the gradual rise portion 130 of the depth cam and an abrupt rise portion 131 of the transverse relief cam. The rollers of the tool holders are illustrated in Figures 20 and 21 at the starting position and the finish position in cutting the semicircular groove 125 illustrated in development in Figure 16. The radial dot and dash lines in the views of the cams indicate the positions of the rollers at the times when the various changes in the configuration of the groove take place.

As illustrated in Figures 22 to 25, inclusive, the steps in the forming of a groove are as follows: First, a single tool 132 is used (Figure 22) and the groove is cut without any variation, but to a general depth, as the shallowest depth of the required groove, this tool also cutting straight in regardless of groove width. This operation may be performed by means of a uniform disk having no surface irregularities whatsoever, or may be cut in any other conventional manner.

Figure 23:
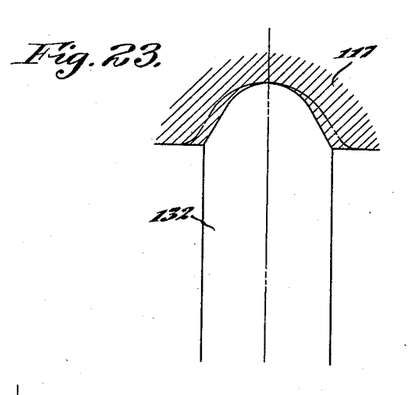
Figure 24:
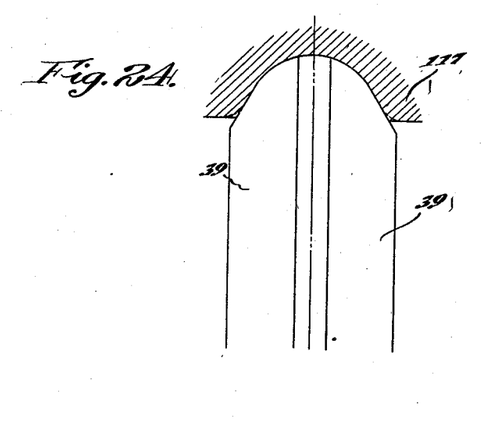
Figure 25:
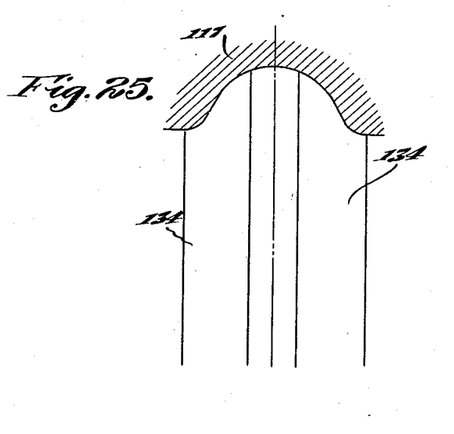

For the second operation, as shown in Figure 23, a single tool 133 is again used for varying the depth of the groove which may also widen the groove uniformly according to the least width of the finished groove, and this tool is actuated by means of depth cams as described heretofore. The contour of the bottom of the groove or the variations in depth may thus be obtained without regard to the sides of the groove.

The third operation (Figure 24) is to introduce the tool sections 37 actuated by a transverse relief cam in addition to the depth cams. Any number of transverse relief tools may be used successively of any shape to arrive at the desired transverse relief for the groove, and the depth cams used in combination therewith guide the spread tools properly relative to the finished depth contour of the groove.

The fourth step (Figure 25) in the formation is to use rounding tool sections 134 which round off the edges of the grooves to the proper radius. For this last operation, it is possible to merely use a transverse relief cam inasmuch as there is no depth variation in each respective inward movement or stroke of the tool sections.

It will be apparent from the description that either sectional or single tools may be used in the relieving attachment of the present invention, depending entirely on the progressive steps of a given operation, and the templet cams are interchangeable as to contour and the depth cam or the transverse relief cam may be used concurrently or independently and the overlap may be arranged in any suitable manner.

Having described my invention, I desire to be limited only by the ensuing claims:

1. Apparatus for forming irregular grooves in a cylindrical surface, said apparatus comprising, a lathe structure adapted to rotate the cylindrical surface, a cross slide, a shaft mounted in said cross slide, said shaft rotatively synchronized with the cylindrical surface, two tool holders mounted upon said cross slide, cutting tools secured in said holders, two cams mounted upon said shaft, mechanism associating said cams and said tool holders so that the cams vary the position of the tool holders in relation to the center of rotation of the work radially, and a third cam mounted on said shaft, said latter cam associated with said tool holders so that the cams contouring determines the spacing of the tool holders axially in relation to the center of rotation of the work.

2. Apparatus for forming irregular grooves in a cylindrical surface, said apparatus comprising, a lathe structure adapted to rotate the cylindrical surface, a cross slide, a shaft mounted in said cross slide, said shaft rotatively synchronized with the cylindrical surface, two tool holders mounted upon said cross slide, cutting tools secured in said holders, two cams mounted upon said rotative element, mechanism associating said cams and said tool holders so that the cams rock the tool holders in relation to the work, and a third cam mounted on said rotative element between said two cams, said latter cam connected to said tool holders so that it varies the spacing of the tool holders as they rock.

3. Apparatus for forming irregular grooves in a cylindrical surface, said apparatus comprising, a lathe structure adapted to rotate the cylindrical surface, a cross slide, a shaft mounted in said cross slide, said shaft rotatively synchronized with the cylindrical surface, two tool holders mounted upon said cross slide, two cams mounted upon said shaft, mechanism associating said cams and said tool holders so that the cams vary the position of the tool holders in relation to the center of rotation of the work radially, a third cam mounted on said shaft, and a wedge adapted to separate said tool slides, said latter cam associated with said wedge so that the cam contouring determines the spacing of the tool holders axially in relation to the center of rotation of the work.

4. The method of forming an irregular groove in a metal piece, comprising, cutting a straight groove by means of a single tool regardless of width and to the shallowest depth of the finished irregular groove to be cut, cutting the depth irregularities by means of a single tool, and cutting the transverse irregularities by varying the spaced relation of two tool sections.

5. The method of forming irregular grooves, comprising, forming a straight groove regardless of width and to the shallowest depth of the finished irregular groove to be cut, forming the depth irregularities regardless of width, and forming the transverse irregularities by varying the spaced relation of tool sections.

6. The successive steps in a method of forming an irregular groove, comprising, first, cutting a straight groove regardless of width and to the shallowest depth of the finished irregular groove to be cut, second, cutting the straight groove to the finished depth irregularities, third, cutting the transverse irregularities of the groove, and, fourth, finishing the edges of the groove.

7. The method of forming irregular grooves in the surface of cylindrical work, comprising, turning the cylindrical surface relative to spaced tools, and varying the spacing of tools at corresponding periods during the revolutions of the cylindrical surface for successive cuts of the tools.

8. The method of forming irregular grooves in the surface of work, comprising, moving the surface relative to the tools, varying the spacing of spaced tools at corresponding periods during the movements of the surface for successive cuts of the tools.

9. An attachment for cutting irregular grooves, comprising, a pair of pivotally mounted tool holders, a wedge mounted between said tool holders, and cams for actuating said tool holders and wedge to simultaneously rock and spread the tool holders.

10. A device of the class described, comprising, a pair of tool holders, a pivot shaft for said holders, an intermediate element for spreading said holders, and means for rocking said holders and actuating said intermediate element.

In witness whereof, I hereunto subscribe my name.

WILLIAM L. SCHELLENBACH.